United States Patent

[11] 3,587,775

| [72] | Inventor | William E. Baier, Jr. |
| | | Houston, Tex. |
| [21] | Appl. No. | 825,594 |
| [22] | Filed | May 19, 1969 |
| [45] | Patented | June 28, 1971 |
| [73] | Assignee | Shell Oil Company |
| | | New York, N.Y. |

[54] HYDROGEN-OXYGEN SOUND SOURCE
3 Claims, 2 Drawing Figs.

| [52] | U.S. Cl. | 181/.5 |
| [51] | Int. Cl. | G01v 1/00 |
| [50] | Field of Search | 181/0.5 |
| | | (IC) |

[56] References Cited
UNITED STATES PATENTS

| 2,679,205 | 5/1954 | Piety | 181/0.5 |
| 3,099,813 | 7/1963 | Anderson | 181/0.5 |

Primary Examiner—Rodney D. Bennett, Jr.
Assistant Examiner—Joseph G. Baxter
Attorneys—Theodore E. Bieber and J. H. McCarthy ABSTRACT: A repetitive sound source for use in seismic exploration wherein a nonexplosive liquid is introduced into a closed container having at least a portion of its wall formed of a flexible material, disassociating the liquid to constituents which are explosively recombinable to reform the nonexplosive liquid, with the process being repeatable to produce additional seismic waves.

3,587,775

HYDROGEN-OXYGEN SOUND SOURCE

BACKGROUND OF THE INVENTION the present invention relates to seismic sources and more particularly to a repetitive seismic source that may be fired at frequent intervals. There is a need in seismic surveys for repeatable seismic sources which can be fired at frequent intervals, for example, in conducting borehole surveys to determine the velocity characteristics of formations penetrated by boreholes. Borehole velocity surveys may be conducted by lowering a series of seismic sources in a borehole, firing them at set intervals and measuring the arrival time of the waves at the surface. Also, there have been developed systems for conducting surveys from a borehole to determine the approximate profile of a salt flank or other interface between two formations.

In the past the need for repeatable seismic sources has been filled by the use of primacord or blank perforating charges of the type normally used for perforating well casings and the like. A string of charges can be lowered in a borehole and fired at predetermined intervals to generate seismic waves. While the use of blank perforating charges and the like is a solution to the problem, the necessity to reload at the surface involves a considerable cost and complicates the possibility of repeating the seismic shot at any particular depth in the borehole. The use of blank perforating charges and the like requires that the shots be detonated from the bottom of any borehole assembly since the detonation of the shot may destroy the electrical circuit connected to the shot and all circuits below the shot. These explosive sources also constitute a safety hazard at the surface and a considerable expense in that they are expendable.

It has also been suggested that it is possible to convey an explosive gas mixture to a container located in the borehole and detonate the gas mixture. While this is a possible solution, it does pose several problems. For example, in a deep borehole, i.e., 10,000 feet the pressure will range between 5,000 and 10,000 p.s.i., depending upon the weight of the drilling mud that is used to fill the borehole. Thus, the gas pressure at the surface will also be in the neighborhood of 10,000 p.s.i. which produces extremely dangerous conditions. For example, where acetylene is used as one of the gases, it is for all practical purposes impossible to supply it under sufficient pressure to convey it to the bottom of a 10,000-foot well. Thus, systems that depend upon piping explosive gas mixtures from the surface are substantially inoperative in any but very shallow wells. Even with gas mixtures that withstand the extreme pressures, there is still considerable danger when handling gases under these extreme pressures.

SUMMARY OF THE INVENTION

The present invention solves the above problems by providing a tool which may be lowered in a borehole to generate an explosive gas mixture in situ that can then be exploded to generate seismic waves. More particularly, the system utilizes a housing which is lowered in the borehole and is provided with an inner sealed container. The container is formed with at least a portion of its wall being flexible and includes means for generating the explosive gas mixture and a means for detonating the gas mixture. The explosive gas is generated from a nonexplosive liquid which may be electrically dissociated into its elemental components which form an explosive mixture. The elemental components are detonated by means of a spark or other energy supplying means to release energy which can be converted to seismic waves. Further, the elemental components upon detonation recombine to form the original liquid that can be again electrolytically dissociated into the elemental components and the process repeated.

Various types of fluids such as water or an aqueous liquid are satisfactory fluids to use. Water is easily electrolytically dissociated into its elemental components, hydrogen and oxygen. In addition, the proportion of hydrogen to oxygen is substantially correct for forming an explosive mixture. When the hydrogen-oxygen mixture is detonated, the hydrogen and oxygen will recombine to again form water. Thus, the process may be continually repeated at set intervals to produce a repeatable source of seismic waves. The repetition or firing rate of the device will depend upon many things, such as a physical size of the downhole tool and the amount of electrical energy that can be supplied to the tool.

BRIEF DESCRIPTION OF THE DRAWINGS the invention will be more easily understood from the following detailed description of a preferred embodiment when taken in conjunction with the attached drawing in which.

DESCRIPTION OF PREFERRED EMBODIMENT

Figure 1:
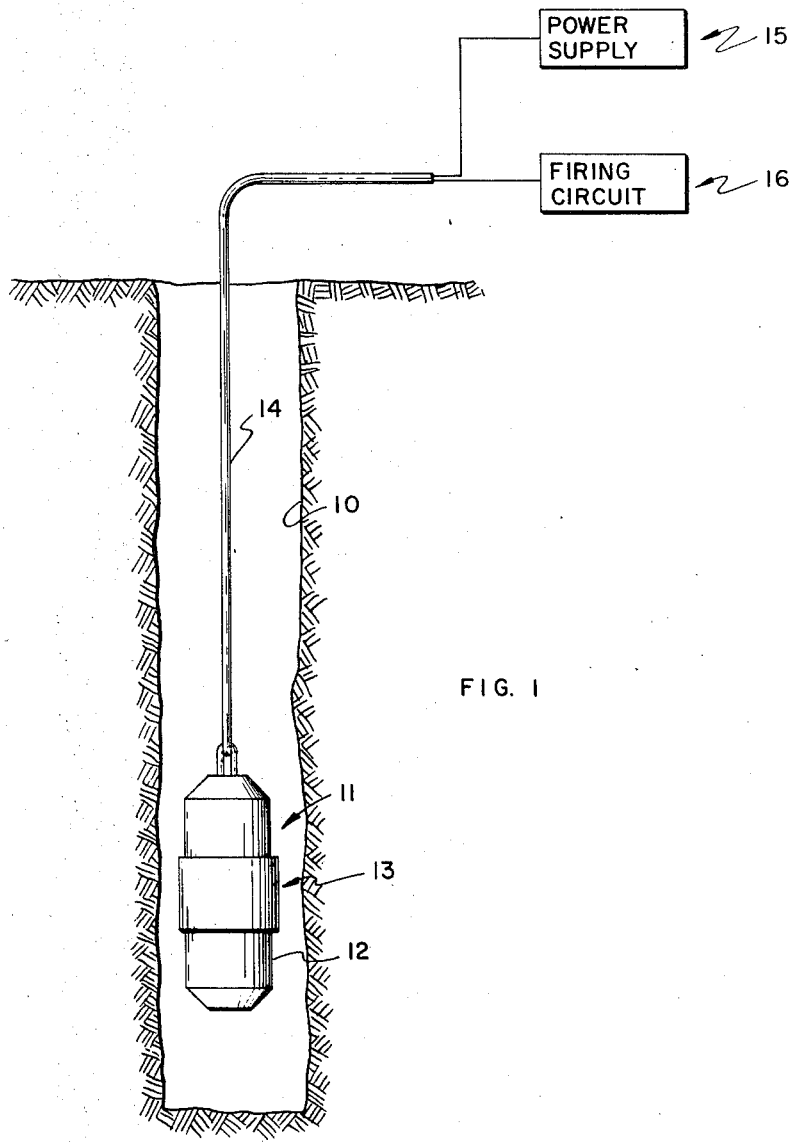
FIG. 1 is an illustration of the invention in use in a borehole.

Referring now to FIG. 1 there is illustrated the use of the invention in a borehole. More particularly, the downhole portion of the system 11 is lowered into the borehole 10 by means of a cable 14. As explained above, the borehole may be drilled in the search of petroleum deposits and utilized for obtaining information regarding the velocity or travel time of seismic waves through the formation penetrated by the borehole. This information is necessary for correcting conventional seismic data for variations in travel time with depth. Further, the borehole may be one that is drilled to conduct a survey to determine the distance between the borehole and an adjacent salt flank or other interface between two formations. Thus, in both velocity and profile surveys, it is necessary to provide a plurality of separate seismic impulses in order that a plurality of repetitive data may be obtained. This provides an accurate determination of the velocity or profile of the salt flank or interface. The profiling of an interface is more particularly described in a copending application of Adair et al., Ser. No. 785,568, filed Dec. 20, 1968, and entitled "Proximity Profiler."

The cable 14 in addition to including the conductors for the required electrical circuits should also have sufficient mechanical strength to permit raising and lowering the sound source in the borehole. For example, conventional well logging cables may be used.

The downhole portion of the sound source includes a housing 12 which has a portion of its outer wall 13 formed of a flexible material. In place of the flexible outer wall 13 it is possible to provide an outer wall formed of metal and having suitable openings so that the pressure waves may be transmitted through the borehole fluids into the formations. The use of an outer steel or metal cylinder for the housing is preferred, since it greatly reduces the chance of physical damage to the flexible portion of the housing. In the case of a steel or metal outer housing, the flexible portion 13 would be placed inside of the steel outer cylinder.

The surface portion of the equipment includes a power supply 15 for supplying power to the system for electrolytically dissociating the fluid and the firing circuit 16 for supplying power to a spark source or other type firing device. The power supply 15 should be capable of supplying power not only for the system for electrolytically dissociating the fluid, but also power the electronic circuits contained in the downhole tool. Normally, the magnitude of the seismic waves generated will be limited by the power-carrying capacity of the conductors contained in the cable 14, and the allowable time between the repeated firing of the device.

Figure 2:
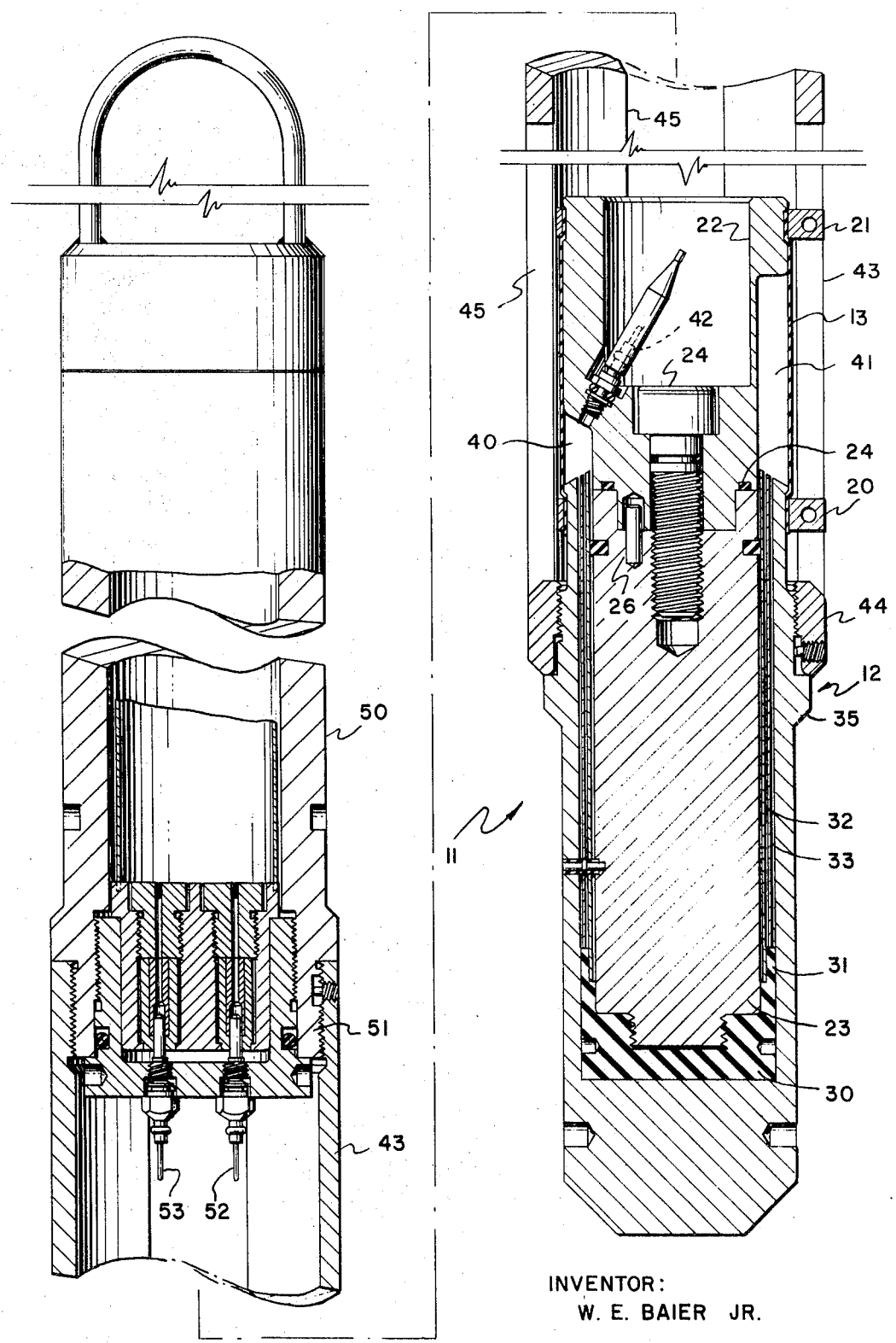
FIG. 2 is a vertical elevation of a downhole portion of the invention.

Referring now to FIG. 2, there is shown an elevation view of the downhole portion of the invention. MOre particularly, there is shown the flexible portion 13 of the container which is disposed within the housing 12. The flexible portion 13 may be formed of suitable materials, such as a section of a rubber tube whose ends are clamped firmly to the outer wall of the container by means of clamping means 20 and 21. The container 12 is formed by a cup-shaped upper member 22 which is attached to a solid lower member 23 by means of a capscrew 24 which threads into the lower member. A dowel pin 26 can be provided for accurately aligning the two pieces and preventing rotation of the two pieces. The lower member 23 forms the inner anode member, a thin-walled tubular section 32 forms one cathode member, a thin-walled tubular member 33 forms a second anode, and the outer housing or shell 35 of the container forms the second cathode. The first cathode and the second anode are attached at their lower ends to an upwardly extending flange 31 formed on a cup-shaped supporting member 30. The supporting member 30 is secured to the inner anode or bottom member 23 by means of a threaded joint or the like. The supporting member 30 may have various forms but must be formed of or coated with an insulating material and preferably of an insulating material having substantial mechanical strength. For example, an epoxy-impregnated fiber glass may be used for forming the supporting member 30. The outer housing 35 has a general cylindrical shape and is closed at its lower or bottom end, while its upper end is secured to the remaining portion of the system. The use of multiple anode and cathode pairs improves the efficiency of the source and also increases its capacity.

The volume between the pairs of anode and cathode members communicates at the upper end with a common annular volume or recess 40 formed on the outer surface of the upper housing member 22. The recess 40 has a generally spiral shape. Thus, the cross-sectional area of the volume 40 increases as it travels around the outer surface of the upper housing member 22 until it has a substantial cross-sectional area at 41. An increasing cross-sectional area is required to insure that the gases that are evolved as the fluid is electrolytically dissociated do not put an undue pressure on the flexible member 13. The upper housing member 22 is also provided with a spark plug or similar device for producing an electrical discharge of sufficient strength to detonate the gas mixture. As shown, the end or tip of the spark plug communicates with the gas volume 40.

The volume between the various electrodes and the gas volume 40 should be partially filled with water or a similar aqueous fluid which can be dissociated into its elemental components. Further, the elemental components should be capable of detonating upon recombination. While no means are shown, at infrequent times it may be necessary to replace the water in the system since a small amount of the water tends to be consumed in the process.

The lower portion of the downhole tool is connected to the upper portion 50 by means of a tubular member 43. Tubular member 43 is secured to the lower portion of the tool by means of a threaded connection 44 and to the upper portion of the tool by means of a threaded connection 51. The tubular member 43 is provided with a plurality of longitudinal slots or openings 45 to permit the pressure waves generated by the detonation of the elemental components of the fluid to travel outwardly through the borehole fluid and into formation.

The upper portion of the tool 50 contains the electronic circuits and suitable connectors for attaching the cable to the tool and supplying power to the remainder of the tool. The electronic circuits, of course, include timing circuits for controlling the application of electrical power to the anode cathode structure as well as firing circuits for the spark plug. The upper portion of the tool is provided with two sealed terminal connections 52 and 53, with the terminal 52 being connected to a second sealed terminal (not shown) which supplies power to the first or inner anode. Terminal 53 is connected to the spark plug 42 that detonates the dissociated elements of the fluid. In addition, the case of the tool is grounded to the power supply by means of a lead not shown in FIG. 2. Thus, the circuit between the anodes and the cathodes of the device is completed as well as the ground circuit of the spark plug.

OPERATION

The above apparatus is operated by filling the bottom portion of the tool with water or some similar aqueous fluid which will electrolytically dissociate into elemental components that form an explosive mixture. For example, hydrochloric acid could also be used, although it is less desirable. After the tool is filled with water, the flexible portion 13 of the lower member can be installed and its ends securely clamped in place. The electrical connections to the tool can then be completed and the tool is ready for lowering in the borehole. The tool can be lowered to the desired level in the borehole, and the power supplied to the anodes of the lower portion of the tool. The magnitude of the power supplied is normally limited by the current-carrying capacity of the logging cable and thus the time required to electrolytically dissociate a sufficient quantity of the fluid will be controlled by this factor. Sufficient time must be provided to evolve the required quantity of gas to generate seismic waves of the desired strength. After a sufficient quantity of gas has been evolved, a high voltage impulse can be applied to the spark plug to cause the evolved gases to detonate. In the case of water, where the evolved gases are hydrogen and oxygen in approximately the desired mixture for an explosive composition, the gases will detonate. The detonation of the gases will cause the two gases to recombine to again form water. After the gases have recombined, the operation can be repeated at the same depth or the tool can be raised to a new depth level and the operation repeated. Of course, during the raising and lowering of the tool, the power can be supplied to the anodes so that when the tool reaches the desired level, a sufficient quantity of gas will have been evolved and the tool will be ready for immediate operation.

From the above description it can be readily appreciated that the present invention provides a seismic source which is simple to operate and can be repetitively fired at various levels in a borehole without requiring the addition of any material from the surface. Further, the only requirement is that electrical power be supplied to the tool to dissociate the fluid into its elemental components. This, of course, greatly increases the safety of operation of the device, since no explosive gas mixtures must be piped downhole nor is it necessary to handle explosive charges such as blank perforating charges. Further, the invention provides a sound source which is relatively compact and, in fact, occupies considerably less space than prior art devices. While the sound source is compact, it is possible to generate seismic waves having substantially the same energy content as those generated using commercially available perforating charges. For example, a sound source having approximate overall dimensions of 3 inches in diameter by 16 inches long is capable of generating seismic waves having an energy content of approximately 150,000 joules. This energy is substantially equal to the energy generated by conventional commercially available perforating charges.

I claim:

1. An apparatus for generating seismic waves in a borehole comprising:
   a cylindrical housing adapted to be lowered in a borehole, said cylindrical housing including a closed cylindrical container having at least a portion of its outer wall formed of a flexible tubular member, said cylindrical housing passing through the center of said flexible tubular member, at least a portion of said tubular member being spaced from said housing to form an annular volume;
   an aqueous liquid said aqueous liquid being disposed within said closed container and capable of electrolytic dissociation into its elemental components, said elemental components being capable of explosively recombining into said fluid with the release of energy;
   anode and cathode means disposed in said container;
   electrical circuit means, said circuit means being coupled to said anode and cathode means to produce a current flow between said anode and cathode to dissociate said fluid into said elemental components;

spark means, said spark means being disposed in said container to produce a spark therein; and a firing circuit coupled to said spark means and disposed to energize said spark means to generate a spark to cause said elements to explosively recombine.

2. The apparatus of claim 1 wherein said housing has a recessed portion formed on its outer surface adjacent the portion of said tubular member that is spaced from said housing, said recessed portion of the housing in cooperation with said tubular member forming said annular volume.

3. The apparatus of claim 2 wherein said recessed portion of said housing has a cross-sectional area that increases from a minimum area adjacent the spark means to a maximum area diametrically opposite said spark means.